(12) United States Patent
Lange

(10) Patent No.: US 8,347,498 B2
(45) Date of Patent: Jan. 8, 2013

(54) METHOD FOR REPAIRING A GUIDE VANE SEGMENT

(75) Inventor: Anja Lange, Langenhagen (DE)

(73) Assignee: MTU Aero Engines GmbH, Munich (DE)

( * ) Notice: Subject to any disclaimer, the term of this patent is extended or adjusted under 35 U.S.C. 154(b) by 868 days.

(21) Appl. No.: 12/296,471

(22) PCT Filed: Mar. 29, 2007

(86) PCT No.: PCT/DE2007/000566
§ 371 (c)(1),
(2), (4) Date: Jun. 24, 2009

(87) PCT Pub. No.: WO2007/115533

PCT Pub. Date: Oct. 18, 2007

(65) Prior Publication Data

US 2009/0265932 A1  Oct. 29, 2009

(30) Foreign Application Priority Data

Apr. 8, 2006  (DE) .......................... 10 2006 016 703

(51) Int. Cl.
*B23P 6/00* (2006.01)

(52) U.S. Cl. .................................. 29/889.1; 29/402.08

(58) Field of Classification Search .................. 29/889.1, 29/402.01, 402.08
See application file for complete search history.

(56) References Cited

U.S. PATENT DOCUMENTS

| 4,176,433 | A | 12/1979 | Lee et al. |
| 5,758,416 | A | 6/1998 | Reverman et al. |
| 6,173,491 | B1 * | 1/2001 | Goodwater et al. ......... 29/889.1 |
| 6,494,677 | B1 | 12/2002 | Grady |
| 6,785,961 | B1 | 9/2004 | Caddell, Jr. et al. |

* cited by examiner

*Primary Examiner* — Alexander P Taousakis
(74) *Attorney, Agent, or Firm* — Greer, Burns & Crain, Ltd.

(57) ABSTRACT

A method for repairing a guide vane segment of a gas turbine, the guide vane segment including at least two guide vanes as well as an inner and an outer shroud. At least one guide vane is irreparably damaged and is separated from the guide vane segment while the guide vane segment is completed by joining at least one replacement vane. If the one irreparable guide vane is located in one half of the segment outside the circumferential center of the guide vane segment, or if the several irreparable guide vanes are located in the same half of the segment, the matching number of guide vanes to be separated from the segment and replacement vanes to be joined to the segment are determined first. The determined number of replacement vanes are then joined to the guide vane segment. The same number of guide vanes, including the at least one irreparable guide vane, are finally separated from the guide vane segment.

9 Claims, 2 Drawing Sheets

METHOD FOR REPAIRING A GUIDE VANE SEGMENT

Figure 1:
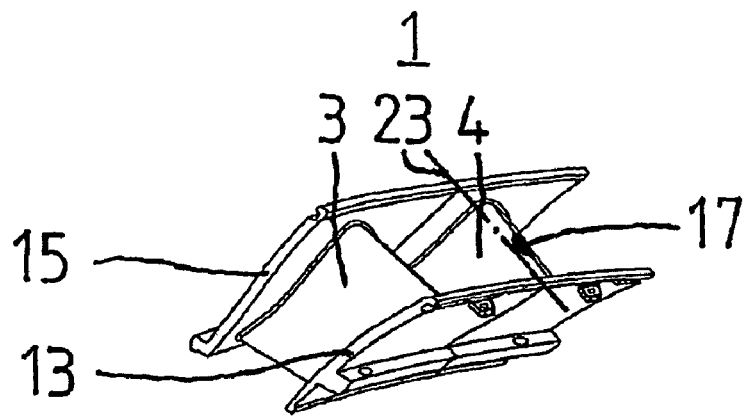

The present invention relates to a method for repairing a guide vane segment of a gas turbine, the guide vane segment comprising at least two guide vanes as well as an inner and an outer shroud, each connected to the guide vanes, according to the preamble of claim 1.

As a rule, gas turbines comprise as main elements a compressor, a combustion chamber, and a turbine, flow taking place through these elements in this order. In two-shaft designs, both in the compressor and in the turbine a distinction is made between a high-pressure range and a low-pressure range, one shaft being designated the high-pressure shaft while the other is the low-pressure shaft. In the high-pressure turbine that immediately follows the combustion chamber, very high temperatures prevail as a result of the process, and the chemically active, aggressive operating gas can cause damage to the components, due for example to oxidation, corrosion, and sulfidation. In this area, as a rule the metallic components are provided with protective ceramic coatings; local damage or destruction of the protective layer will result very quickly in local damage to the component, due for example to overheating of the material and material wear up to perforation. The high thermal, cyclical alternating loads, with expansion and contraction of the component, can also result in the formation of cracks, and eventually breaks. The mechanical load due to the flow additionally supports these causes of damage. In addition, in rotating components the high tensions induced by centrifugal forces must also be taken into account. Active cooling measures, in particular for the guide vanes and impeller vanes, can significantly prolong the life span of the components. Nonetheless, especially in the area of high-pressure turbines, the sum of the stresses and causes of damage is so large that components must be repaired, restored, renovated, and/or replaced at certain temporal intervals.

The present case specifically concerns the repair of a guide vane segment of a gas turbine, in particular of a high-pressure turbine guide vane segment. For several reasons, guide vanes are often combined to form segments/clusters having two or more vanes per unit. In comparison with individual vanes, this reduces the number of joints/gaps, thus also reducing gap losses. Fewer attack surfaces are offered to the aggressive hot gases, which has a positive effect on overall service life. The segments/clusters form mechanically stable units, reducing relative movement and wear. However, segments are more expensive to manufacture and to replace. Accessibility for repairs is also more difficult, especially between the vanes. With the use of guide vane segments, it more often happens that after longer operation only one guide vane, or at least not all the guide vanes, are irreparably damaged, while the rest of the vanes are undamaged or are repairable. In such cases, for reasons of cost it is sought to separate only the irreparable vanes from the segment and to replace them with undamaged vanes, e.g. new, repaired, or repairable vanes.

Such a repair method is described in US letters patent U.S. Pat. No. 6,785,961 B1. Here, in principle first the at least one irreparable guide vane is separated from the segment, and subsequently a new guide vane is connected to the remaining segment at the point of separation. As shown in the Figures, what are concerned are often segments having only two guide vanes, i.e. what is known as a twin guide vane. In the procedure according to this US patent, it is problematic to precisely orient the new part, with its machining tolerances, relative to the remaining segment, which has been made to measure and which may have deviations, resulting from use, from the geometry of the new part. This difficulty in orientation is due to the fact that too few reliable reference points, such as flange bores, are present on the remaining segment, which may consist only of one guide vane with shroud segments.

Against this background, the object of the present invention is to indicate a method for repairing a guide vane segment of a gas turbine that comprises the step of separating at least one irreparable guide vane from the segment, and the step of joining at least one undamaged or repairable guide vane to the segment, such that after the execution of these steps a restored guide vane segment is provided that is comparable to a new part with regard to dimensional accuracy, stability, and durability.

This object is achieved by the features characterized in patent claim 1, in connection with the generic features in the preamble of said claim. The present invention is to be regarded as consisting in that at first at least one replacement vane is joined to the guide vane segment that is to be repaired, and only after this has been done at least one irreparable vane is removed, at the opposite end of the segment. Thus, in all steps of the method the number of vanes on the guide vane segment is equal to, or is even greater than, the nominal number of vanes of the segment. In this way, at all times a sufficient number of clear reference points are available, making it possible to precisely position at least one replacement vane relative to the segment, and subsequently to separate at least one irreparable vane from the segment precisely in the plane of separation that forms the new segment end. Good candidates for such reference points include, inter alia, bores in a radially inward-pointing fastening flange on the inner shroud. The method according to the present invention is not provided for the purpose of cutting out irreparable vanes between intact or repairable vanes and then filling the gap. If only one vane is irreparable, this vane should be situated outside the circumferential center of the guide vane segment; i.e., in a segment half. If a plurality of vanes are irreparable, these should be situated outside the circumferential center, in the same segment half. In principle, the number of vanes to be joined to the segment corresponds to the number of vanes to be separated from the segment, because the nominal vane number is to be maintained. This number is to be determined in such a way that, beginning with the irreparable vane situated closest to the circumferential center of the segment, the vane positions (vanes) are counted up to the circumferential end of this segment half. A corresponding number of undamaged, in particular new, and/or repairable replacement vanes are then joined to the end of the segment half that does not have any irreparable vanes. After this method step, the guide vane segment temporarily has a greater number of vanes than its nominal number of vanes, and thus has a too-large extension in the circumferential direction, i.e. angular extension. A number of vanes corresponding to the above counting result is then separated from the segment end situated opposite the joined replacement vanes, and the one or more irreparable vanes are removed during this step. It can happen that, as a result of their position, undamaged or repairable vanes are also removed at this point. If warranted, these can be reused later as replacement vanes. After the separation, the guide vane segment again has its nominal number of vanes and its intended dimensions.

Further realizations of the present invention are characterized in the subclaims.

In the following, the present invention is explained in more detail on the basis of the drawings, which are simplified and not to scale.

Figure 2:
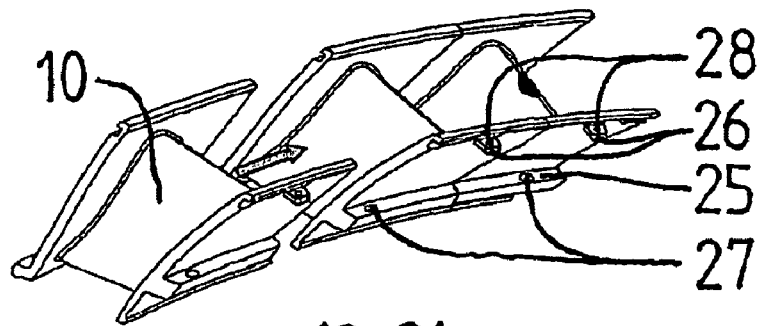
Figure 3:
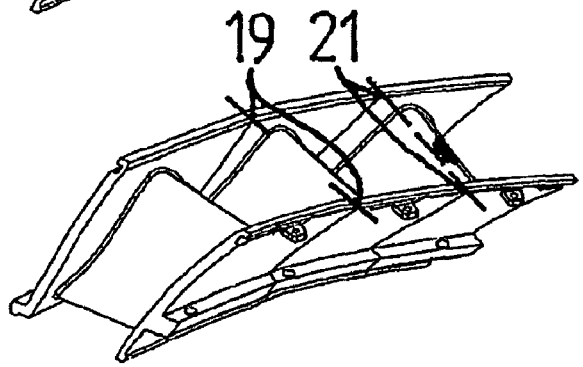
Figure 4:
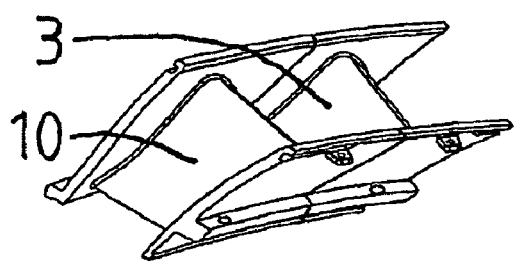
Figure 5:
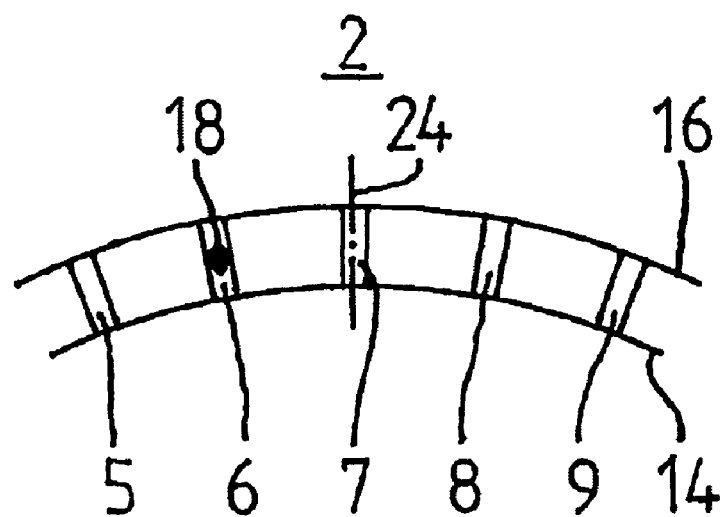
Figure 6:
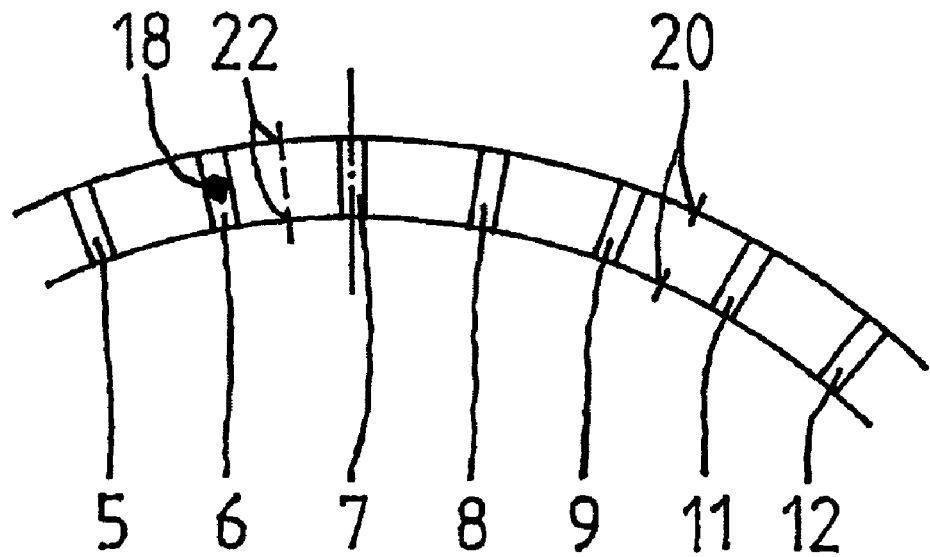

FIG. 1 shows a perspective view of a guide vane segment having two guide vanes, of which one is irreparably damaged, FIG. 2 shows a comparable view including a replacement vane that is to be joined to the guide vane segment, FIG. 3 shows a comparable view after the joining of the replacement vane, FIG. 4 shows a comparable view after the separation of the damaged guide vane from the guide vane segment, FIG. 5 shows an axial view of a guide vane segment having five guide vanes, of which one is irreparably damaged, and FIG. 6 shows a comparable view after the joining of two replacement vanes to the guide vane segment.

FIG. 1 shows a guide vane segment 1 having a minimum number of vanes, i.e. two guide vanes 3 and 4. Such an arrangement is also called a twin guide vane. One of the two guide vanes, here at position 4, has irreparable damage 17, e.g. in the form of a breakage in the area of its leading edge. The expression "irreparable" here is not to be understood in an absolute sense, but rather in the sense that it would no longer make sense economically to repair the vane. As a rule, such damages result during operation of the component, but they may also be already present as a result of manufacturing, or may be "pre-programmed," e.g. in the form of insufficient wall thickness, insufficient coating, a defect in joining, etc. Guide vanes 3, 4 are connected to one another via a radially inner shroud 13 and via a radially outer shroud 15. This makes it possible e.g. to cast the entire guide vane segment 1 in one piece or to produce it powder-metallurgically. However, individual vanes manufactured by casting, forging, machining, or powder metallurgy may also be materially bonded to a segment, e.g. by soldering or welding.

The circumferential center 23 of guide vane segment 1 is indicated at the entry side by a dash-dot line. In guide vane segments having an even number of vanes, as a rule the circumferential center is situated between two guide vanes, while in guide vane segments having an odd number of vanes the circumferential center will as a rule correspond at least approximately to the position of the center guide vane. Because the impact edges of the shrouds often run not axially, but rather obliquely to the axial direction, adapted to the setting angle or attack angle of the guide vane profiles, the circumferential center on the entry side of the guide vane segment often has an angular offset relative to the circumferential center at the exit side. The circumferential center is thus not a concrete, precise position, but rather is a fictive, approximate position, for the better understanding of the present invention.

In addition to damaged guide vane segment 1, FIG. 2 shows a replacement vane 10 that is to be joined thereto. Because at the time of joining guide vane segment 1 is still complete, it has a sufficient number of reliable reference points, here in the form of bores 27 and 28 on a flange 25 and on tongues 26 on inner shroud 13. With the aid of these reference points, replacement vane 10 can be positioned with sufficient precision and stability before and during joining.

FIG. 3 shows the state after joining, in which guide vane segment 1 has one vane too many, because damaged guide vane 4 has not yet been separated. Join point 19, located between replacement vane 10 and remaining guide vane 3, is marked at the entry side on shrouds 13, 15 by two short lines. Point of separation 21 between guide vane 3 and damaged guide vane 4 on shrouds 13, 15 is indicated at the entry side by a broken line.

Finally, FIG. 4 shows the restored guide vanes segment having the nominal number of vanes and the intended geometry, such that—after separation of guide vane 4—replacement vane 10 and guide vane 3 are still present. The state of each of the remaining vanes may be undamaged, repaired, or at least repairable. Possible repair methods for vanes and shrouds include for example a repair welding, a repair soldering, and/or an at least local coating, after a preliminary coating removal if necessary.

FIG. 5 shows, in highly schematized form, a guide vane segment 2 having five guide vanes 5 to 9, a radially inner shroud 14 and a radially outer shroud 16. Circumferential center 24 is indicated by a vertical dash-dot line, and corresponds at least approximately to the position of center, third guide vane 7. Second guide vane 6 (counted from the left segment end) has an irreparable damage 18 and must therefore be replaced. Because guide vane 6 is situated outside circumferential center 24, in the left segment half, and neither center guide vane 7 nor one or both guide vanes 8, 9 in the right segment half are irreparably damaged, the conditions are met for repair according to the present invention. The vane positions are now counted, beginning with damaged guide vane 6, until the left segment end is reached. In the present case this comes to two positions, namely the positions of guide vanes 6 and 5. Thus, according to the present invention, as the next step two replacement vanes 11, 12 are joined to the oppositely situated, right guide vane end, so that guide vane segment 2 temporarily has seven vanes.

FIG. 6 shows this temporary state; join point 20 and replacement vanes 11, 12 are visible. Before the joining, the replacement vanes may be realized as individual vanes or as twin guide vanes, i.e. as a guide vane segment. Finally, guide vanes 5 and 6 are removed from guide vane segment 2 at separation point 22. Here it is also possible first to separate the undamaged or at least repairable guide vane 5, and subsequently to separate irreparable guide vane 6. Guide vane 5 is then available as a replacement vane for the repair of further segments.

It can be seen that the method according to the present invention for repairing guide vane segments makes sense economically only if the number of undamaged or repairable guide vanes remaining on the segment is at least as great as the number of guide vanes that are to be separated from the segment, which in turn corresponds to the number of replacement vanes that are to be joined to the segment. In the case of a segment having two vanes, a maximum of one vane is to be removed and replaced, and in the case of a segment having three vanes the maximum is likewise one vane. For segments having four or five vanes, a maximum of two vanes are to be removed and replaced. Segments having more than five vanes are conceivable, but are rare in practice.

The invention claimed is:

1. A method for repairing a guide vane segment of a gas turbine, wherein the guide vane segment has a plurality of radially or predominantly radially oriented guide vanes, a radially inner shroud and a radially outer shroud, the inner and outer shrouds each being connected to the guide vanes, the method comprising:

determining a number of irreparable guide vanes of said guide vanes in said guide vane segment, the guide vane segment including a circumferential center;

determining if the irreparable guide vanes are situated outside of the circumferential center of the guide vane segment in a first segment half;

performing further steps when said irreparable guide vanes are situated outside of the circumferential center of the guide vane segment in the first segment half, the further steps including:

counting a number of guide vane positions beginning with the guide vane position associated with the irreparable guide vane situated closest to the circumferential center and ending with the guide vane position associated with a guide vane at the circumferential end of the first segment half;

joining a number of undamaged and/or repairable replacement guide vanes to a circumferential end of a second segment half of the guide vane segment, said number of undamaged and/or repairable replacement guide vanes being equal to the counted number of guide vane positions; and separating the guide vanes associated with the counted number of guide vane positions from the first segment half, the separated vanes including the irreparable guide vane or vanes.

2. The method as recited in claim 1, wherein the guide vane segment includes one of an even number of guide vanes and an odd number of guide vanes, up to a maximum number of five guide vanes.

3. The method as recited in claim 2, wherein a guide vane segment having two guide vanes is a twin guide vane.

4. The method as recited in claim 1, wherein the joining of the undamaged and/or repairable replacement vanes and the separating of the guide vanes associated with the counted number of guide vane positions each include separating the inner shroud and the outer shroud.

5. The method as recited in claim 1, wherein the joining of the undamaged and/or repairable replacement vanes includes at least one of welding and soldering the undamaged and/or repairable replacement vanes.

6. The method as recited in claim 1, wherein the joining and separating steps include using a plurality of unambiguous reference points, such as bores through a flange in an area of the inner shroud on the guide vane segment to be repaired, or on a remaining guide vane segment.

7. The method as recited in claim 1, wherein guide vanes remaining on the guide vane segment, and/or repairable replacement vanes that are to be joined to the guide vane segment are restored before being joined to the guide vane segment, after being jointed to the guide vane segment or after the separating of at least one guide vane from the guide vane segment.

8. The method as recited in claim 7, wherein the restoration includes at least one of welding, soldering and at least local coating.

9. The method as recited in claim 1, wherein at least of said guide vanes separated from the guide vane segment is an undamaged or repairable guide vane, and wherein said undamaged or repairable guide vane is reused as a replacement vane.

* * * * *

UNITED STATES PATENT AND TRADEMARK OFFICE
CERTIFICATE OF CORRECTION

| | | |
|---|---|---|
| PATENT NO. | : 8,347,498 B2 | Page 1 of 1 |
| APPLICATION NO. | : 12/296471 | |
| DATED | : January 8, 2013 | |
| INVENTOR(S) | : Lange | |

It is certified that error appears in the above-identified patent and that said Letters Patent is hereby corrected as shown below:

In the Claims:

Claim 9, Col. 6, line 19, insert --one-- after "wherein at least" and before "of said guide vanes".

Signed and Sealed this
Tenth Day of June, 2014

Michelle K. Lee
*Deputy Director of the United States Patent and Trademark Office*